June 24, 1930.  F. T. RUSSELL  1,766,227
AUTOMATIC CLUTCH
Filed Sept. 2, 1925

INVENTOR
Frederick T. Russell
BY
Jeffery, Kimball & Eggleston
ATTORNEYS

Patented June 24, 1930

1,766,227

UNITED STATES PATENT OFFICE

FREDERICK T. RUSSELL, OF UTICA, NEW YORK, ASSIGNOR TO SAVAGE ARMS CORPORATION, OF UTICA, NEW YORK, A CORPORATION OF DELAWARE

AUTOMATIC CLUTCH

Application filed September 2, 1925. Serial No. 53,971.

Figure 1:
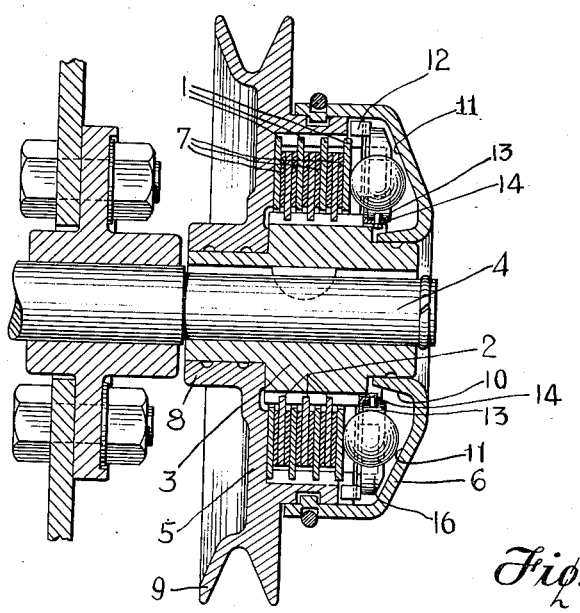
Figure 2:
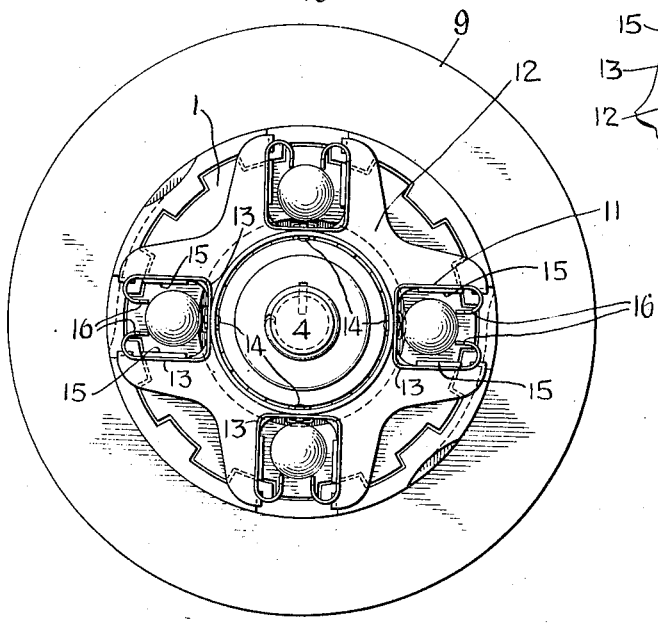

The invention relates to automatic clutches useful in various relations and with motors of different kinds, but especially suitable for use in the drive connection between electric motors, particularly split phase motors, and the apparatus driven by them and in particular such apparatus as clothes-washing machines and other domestic appliances, and is, in its more immediate aspects, an improvement on clutches of the centrifugally operated type, such as that illustrated in the patent of George W. Dunham, No. 1,678,638, July 31, 1928. Its purpose is to insure precision and to concentrate the whole clutching action into a small speed range, i. e. to obtain uniformly correct timing and promptness of clutch action both in clutching and in unclutching, thereby eliminating risk of imposing or continuing load on the motor, while the latter is running at too low a speed to carry it safely. This is accomplished by preventing the outward movement of the centrifugal means and the initiation of the clutching action until a speed sufficient to preclude damage to the motor is reached, by causing the completion of the clutching to follow quickly upon its initiation, and by definitely insuring return of the centrifugal means on stoppage of the motor, or on its falling below the critical speed. The construction illustrated prevents sticking of the centrifugal means and resultant burning out of the fuses of motor. The invention lies not only in a clutch which is of general application, and may be used with electric motors of various kinds, but also in the combination with a split phase motor of a clutch which cannot begin to operate until the motor has reached a certain predetermined speed, i. e. substantially that at which the starting winding of the motor is cut out, thus precluding the possibility of imposing load on the motor prematurely and preventing burning out of the motor as stated. It will be apparent that such a clutch is especially desirable also, for other motors which are not adapted to carry safely a large load at reduced motor speeds, such, for example, as synchronous alternating current motors, etc.
In the drawing which shows a clutch of the type of said patent and in which the invention is embodied, Fig. 1 is an axial section through the clutch; Fig. 2 an end elevation with the cover removed, and Fig. 3 a detail of part of the ball spacer showing spring means by the application of which the results above mentioned are secured.

The clutch herein illustrated and which will first be described comprises two sets of inter-registering annular steel clutch disks marked 1 and 2 respectively and contained in the space between the inner clutch member 3, formed as a hub to be keyed or fixed on a shaft 4 or other rotatable member, and an outer clutch member 5 which, with its cover stamping 6, forms a housing surrounding and enclosing the hub and disks and the operating means of the latter, the hub constituting one main clutch member and the housing the other, either being the driving member and the clutch-operating means being connected to rotate with the driving member about the clutch axis. The sets of disks marked 1 and 2 are respectively splined by multi-splined grooves to the cylindrical part or barrel of the outer clutch member 5 and to the hub or other clutch member 3, suitable friction material being interposed between the disks as by the washers 7.

The clutch member 5 is formed with a journal sleeve 8 at one end or side, by which it is rotatably engaged with or mounted on the end of the hub member 3 and it is exteriorly provided with a wheel element 9 having in the present case a simple sheave groove adapted to accommodate a belt. The barrel part of the clutch member 5 is cylindrical in form to receive the clutch disks and is closed with a cover 6 fitted to the barrel part by being telescoped over it and it is preferably punched with the center open to expose the adjacent end of the hub and also inwardly bossed as indicated at 10 to give a support for the cover on the end of the hub.

The cover is dished or coned or otherwise provided with an interior inclined surface 11 for co-action with a set of balls, or equivalent centrifugal means for operating clutch disks. Provision is made to cause the balls to be carried with the driving member (itself driven as by the motor armature) as it rotates around the longitudinal axis of the clutch. They thus fly outward under the centrifugal effect, when the driving clutch member is rotated at a sufficient speed to produce this result, and by rolling up the inclined surface 11 press the disks together, thereby producing a more or less positive drive connection between the two main clutch members, viz., the hub and the housing. The balls, in the present case four in number, are loose in spaced radial outwardly narrowing recesses in the clutch structure in which they are adapted to roll freely, and are held in equi-angular positions, as by a ball spacer 12, which may be a simple stamping of sheet metal and concentrically mounted on either the cover boss or the hub, according to the direction of power transmission.

Up to this point the clutch described is of the type of said patent. In order to secure in such a device the special advantages above referred to, the present invention provides resistance to the outward movement of the balls of such a nature, or mode of operation, that it has its maximum effect only below a certain, relatively low, motor speed, substantially that at which the starting winding of the motor is cut out, thereby preventing initial outward movement of the balls or other equivalent centrifugal means and closing or partial closing of the clutch below that speed; when the rate of rotation exceeds said relatively low speed and the centrifugal means overcomes the opposition to its initial clutch-operating movement and thereupon starts outward, such resistance decreases from its maximum, so as readily to permit further outward movement of the centrifugal means and the prompt closing of the clutch, the arrangement being such that the balls or other equivalent centrifugal means obtain a mechanical advantage as the speed increases and the balls move further out. The resistance which I employ is a spring resistance which yields abruptly as the maximum effect is overcome and which in addition to the advantages of operation just pointed out is available to return the balls promptly toward the center when the rotation drops below the critical speed or ceases.

Figure 3:
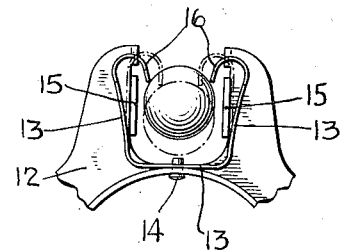

The spring resistance and return means here illustrated consists of a series of U-springs 13 individually secured at 14 to the ball spacer 12, adjacent each ball location and symmetrically located with respect to the central radial plane through the ball space. The free ends of each of these springs extend outward passing on the outside of the upturned stop cheeks 15 of the ball spacer 12 at each side of each ball space and having their ends 16 inturned and returned so that they present themselves substantially edgewise in the path of outward movement of the adacent ball, thus acting as resiliently supported stops and exercising the retarding, or initial outward-movement-resisting effect just described, but, as indicated in Fig. 3, decreasing in their resistance to the outward movement of the ball as the speed increases and the ball thereupon moves outward. The ends 16 of each spring 13 extend to points short of the radial axis of the recess and are nearer together than the diameter of the ball, and the cover, balls and adjacent parts are so proportioned and related that the balls cannot pass out beyond the control of their respective springs which return them as soon as the force exerted by the springs in superior to that of the centrifugal force then acting, that is, whenever the motor stops or materially slackens.

In operation, when the predetermined speed is reached the balls overcome the initial resistance of the springs; each ball wedges into the space between its pair of spring legs to the extent permitted by the limitation on the amount of outward ball movement. The obstruction of the springs is at first considerable, owing to the relatively abrupt angle of initial contact as compared to the subsequent angle, after the ball has spread the legs farther apart. Thus in all positions of any of the balls and their springs between the initial position and that of substantial tangency of the spring ends 16, a position never actually reached by the balls, the resistance to outward movement progressively decreases, the angle between the spring ends 16 and the tangent to the ball at the point of contact changing gradually from a substantial maximum angle to zero, or substantially zero, in the theoretical position of double tangency.

It will be understood that while the invention is applicable especially to a clutch of the type described, it may be embodied otherwise than as shown, and that the combination referred to earlier in the specification is not dependent on the adoption of the particular construction illustrated.

Claims:

1. A clutch having spaced centrifugal members, a spring member at each side of each centrifugal member having a free end extending toward the centrifugal member and meeting the surface thereof at an angle which decreases as the centrifugal member moves outward.

2. A clutch having spaced centrifugal members, a spacer therefor having spaces for the centrifugal members, a strip spring member secured to said spacer at each side of each space, having a free end extending toward the centrifugal member and meeting the surface thereof at an angle which decreases as the member moves outward and a stop on the spacer on the inside of each spring member limiting the movement of said spring members toward each other.

3. In a centrifugal clutch, a centrifugal member spacer having individual spaces for centrifugal members, a series of U-shaped springs each secured to said centrifugal member spacer adjacent one of the spaces and having legs respectively extending outward at each side of the adjacent space beyond said centrifugal members and having corresponding free outer ends returned on themselves on the side toward the centrifugal member into the outward path thereof.

4. In a centrifugal clutch, a centrifugal member spacer having spaces with right-angular stop cheeks adjacent each space, a U-spring secured to the spacer adjacent each centrifugal member at the rear thereof and extending outwardly outside said cheeks and having inturned ends in the outward path of the member, said cheeks preventing inward movement of the springs beyond normal inactive position.

5. A clutch comprising sets of inter-registering driving and driven clutch disks, a hub member splined to one set, a housing splined to the other, centrifugal members rotated with the driving set for pressing the disks together, and springs each interposed in the outward path of one of said members and resisting its initial outward movement with maximum effect, the centrifugal members above the critical speed of motor rotation at which clutch operating movement takes place gaining mechanical advantage as they move outward.

6. A clutch comprising sets of inter-registering driving and driven clutch disks, a hub member splined to one set, a housing body and cover, said housing body being splined to the other set, centrifugal means carried by the driving member and acting with the cover for pressing the disks together, and U-springs each resisting initial outward movement of the centrifugal means more strongly than their subsequent outward movement and acting to return said centrifugal means as the speed of rotation slackens.

7. A clutch comprising sets of inter-registering driving and driven clutch disks, a hub member splined to one set, a housing splined to the other comprising a housing body and a cover, centrifugal balls for pressing the disks together, a ball spacer connected to the housing for rotation therewith, U-springs secured to said ball spacer each adjacent one of the respective balls and having inturned ends opposed to said balls in the path of their outward movement and spaced apart less than the diameter of the ball.

8. A clutch having a driving and a driven member and comprising a housing having a journal member at one end and a barrel at its other end, an exteriorly formed wheel element, sets of inter-registering clutch disks contained within the barrel, one set being splined to said barrel, and a hub member within the housing splined to the other set, centrifugal balls for pressing the disks together, a ball spacer for said balls carried by the driving member of the clutch, a series of U-springs secured to the ball spacer each adjacent one of said balls and having legs straddling the adjacent ball, extending outward beyond it and having free ends returned on the legs into its centrifugal path, the inturned portions of each spring being spaced apart less than the diameter of a ball and exerting their maximum obstructive effect against initial clutch operating centrifugal movement of the balls, whereby clutch operation is prevented only below a minimum speed of motor rotation, the balls gaining a mechanical advantage as they move outward owing to the change of angle of the spring ends with respect to the ball surface.

9. In a centrifugal clutch, a centrifugal-member-spacer stamping having equi-angularly related spaces for the centrifugal members and carrying springs means at the sides of said spaces for imposing a predetermined resistance to centrifugal member movement.

10. A clutch having spaced centrifugal clutch-operating members, and individual spring means associated with each such member resisting outward movement thereof, symmetrically located with reference to the central radial plane therethrough and co-operating with opposite sides thereof and having their maximum effect only below a certain motor speed.

11. A clutch comprising and housing loose spaced centrifugal clutch-operating members, and independent spring means for each such member furnishing maximum initial opposition to clutch-operating movement thereof and lesser resistance thereafter and symmetrically located with reference to the central radial plane therethrough.

12. A clutch structure comprising driving and driven members and housing clutch mechanism, said structure including a casing, and said clutch mechanism including friction clutch means and centrifugal balls loose in spaced recesses in said structure and interposed between the clutch means and the casing, and spring means associated with said balls and exerting maximum initial opposition to the clutch-operating movement thereof and lesser resistance thereafter and constituting ball-returning means.

13. A clutch structure as set forth in claim 12, in which the casing is a cup-chaped stamping having an annular wall inclined outwardly and axially toward the friction clutch means and with which the balls coact as they move outward to effect a clutch-operating wedging action.

14. A friction clutch comprising driving and driven members and housing centrifugal clutch-operating balls, loose in separate spaced recesses, and individual controlling and returning spring means for each of said balls acting to keep the driving member of the clutch substantially free of clutch friction below a critical speed at and below which said spring means has its maximum effect.

15. A clutch comprising a driving member and a driven member, a spherical ball acting centrifugally to clutch them together, and a spring directly engaging and restraining the ball, said spring having its initial contact with the ball at an angle unfavorable to spring displacement thereby and adapted to be deflected by the ball, to a more favorable angle, under a predetermined centrifugal force.

16. A clutch having a driving and a driven member one of which has a housing wall, spaced loose balls interposed between said driving and driven members in outwardly narrowing space bounded by said wall so as to contact with said wall on moving outward and to occupy said space and clutch the driving and the driven members together, and spring means resisting outward movement of said balls and having its maximum effect only below a predetermined speed of the driving member and when said speed is exceeded permitting the balls to move outward and effect the clutching operation.

17. A clutch comprising a driving member and a driven member, a ball arranged to roll in a recess formed between opposed relatively movable parts of the clutch structure and acting centrifugally by wedging between said parts to clutch said members together, and spring means opposing greater resistance to initial clutch closing movement of said ball than to its movement thereafter.

18. A clutch having rotatable structure providing spaced radial recesses, a centrifugal ball adapted to roll in each such recess, spring means mounted on said structure and having a part subject to ball contact extending into the outward path of the ball to a point short of the radial axis of the recess and adapted to resist initial clutch-operating movement of the ball more strongly than subsequent ball movement.

19. A clutch structure comprising driving and driven members and including friction members respectively rotatable therewith, a transverse wall member, and centrifugal balls each loose in one of a series of spaced radial recesses in the clutch structure and interposed between the friction members and said wall member, and spring means associated with said balls and exerting maximum opposition to the initial clutch-operating movement thereof and lesser opposition thereafter and constituting ball-returning means.

20. A clutch structure as set forth in claim 19 in which said wall member has an annular portion inclined outwardly and axially toward the friction members and with which the balls coact as they move outward to effect a clutch-operating wedging action.

21. A clutch having spaced centrifugal clutch-operating members, free to roll in outwardly narrowing recesses formed by clutch structure, and thereby wedge between opposed parts of said clutch structure and apply the clutch by relative axial movement of said parts, means supported by clutch structure adjacent said centrifugal members, projecting into the path thereof for contact therewith, comprising spring structure and having its maximum effect only below a certain motor speed and yielding abruptly as the maximum effect is overcome to permit the clutching action to take place.

22. A clutch having spaced centrifugal clutch operating balls adapted to roll freely in the clutch structure, and means extending into the path of the balls resisting outward clutch closing movement thereof and having its maximum effect only below a certain motor speed, above which the resistance abruptly decreases to permit clutching action to begin, said clutch being adapted to return the balls by spring action as the speed of rotation drops.

23. A clutch having a centrifugal ball, a flat spring member engaging said ball by its edge and meeting the surface of the ball at an angle which decreases as the ball moves outward.

24. A clutch having a plurality of spaced radial recesses, a centrifugal member loose in each said recess, and a pair of symmetrically located spring members extending into the path of each centrifugal member and meeting the surface thereof on opposite sides of the radial axis of the recess and at an angle which decreases as the centrifugal member moves outward.

25. A clutch comprising sets of inter-registering driving and driven clutch disks, a transverse wall member, centrifugal means carried by the driving member and reacting with the wall member for pressing the disks together, and U-springs each resisting initial clutch-operating movement of the centrifugal means more strongly than their subsequent movement and acting to return said centrifugal means as the speed of rotation slackens.

26. A clutch comprising sets of inter-registering driving and driven clutch disks, centrifugal balls for pressing the disks together, ball spacing structure connected to the driving member for rotation therewith, U-springs secured to said ball spacing structure each adjacent one of the respective balls and having inturned ends opposed to said balls in the path of their outward movement and spaced apart less than the diameter of the ball.

27. A clutch having spaced centrifugal clutch operating members, centrifugal-member-controlling and returning spring fingers each located adjacent one of said members and having a part extending into the outward path of the member and furnishing maximum resistance to its initial centrifugal movement and lesser resistance thereafter.

28. A clutch having clutch structure providing confined space, spaced centrifugal clutch operating member carried loose in said space so as to move bodily outward to close the clutch on overcoming predetermined resistance, centrifugal-member-controlling and returning springs each located adjacent one of the centrifugal members, extending into its outward path and furnishing maximum resistance to its initial centrifugal movement, said centrifugal members gaining mechanical advantage on overcoming said maximum resistance, and means for preventing movement of each centrifugal member beyond the control of its spring.

29. A clutch comprising sets of inter-registering driving and driven clutch disks, a hub member splined to one set, a housing splined to the other, centrifugal members rotated with the driving set and loosely mounted in confined outwardly narrowing space in said housing between it and said disks for wedging the disks together, and means opposing outward movement of each centrifugal member and having its maximum effect only below a certain motor speed.

30. A clutch comprising a driving member and a driven member and having a centrifugal clutch-operating member rotatable with the driving member of the clutch and carried loose in confined outwardly narrowing space in the clutch structure, so as to move bodily outward therein under the influence of centrifugal force and wedge into and widen said space to close the clutch, and one or more spring fingers resisting the outward movement of said centrifugal member, located in the path of said member and meeting it at angles which decrease as the centrifugal member moves outward.

31. A friction clutch comprising driving and driven members, a centrifugal member rotatable with the driving member of the clutch and carried loose in confined outwardly narrowing space in the clutch structure so as to move bodily outward therein under the influence of centrifugal force and wedge into and widen said space to close the clutch, and spring means to which said centrifugal member is operatively connected opposing such centrifugal movement and having its maximum effect in restraint thereof only below a certain speed of the driving part of the clutch and substantially preventing clutch action below said speed.

32. A clutch having driving and driven members, centrifugal clutch-operating members loosely mounted for bodily movement in wedging contact with opposed walls of separated outwardly narrowing radial recesses in the clutch structure, and means extending into the path of such centrifugal members resisting outward movement thereof, said means including spring structure and having its maximum effect only below a certain motor speed and yielding abruptly as the maximum effect is overcome to permit the clutching action to begin.

33. A friction clutch comprising driving and driven members and having a transverse wall carried by one of said members and friction disks carried by one or the other of said driving and driven members, a member loosely held in an outwardly narrowing recess formed between said wall and disks and acting by centrifugal effect to wedge into said recess and close the clutch, and resiliently supported stop means in the outward path of said loosely held members opposing clutch-operating movement thereof and having its maximum effect only below a certain speed of the driving part of the clutch and substantially preventing clutch friction below said speed.

34. A clutch adapted to be interposed in the drive of a motor having a critical speed above which it is adapted to carry a certain load for the normal drive of the latter, said clutch having a rotatable enclosing structure, friction clutch members housed therein and adapted for interposition between the motor armature and such load, spaced centrifugal members loose in separate outwardly narrowing recesses provided in the clutch structure, housed by the rotatable clutch structure, rotating with the armature-connected member of said clutch, i. e., the driving member and wedging in between the recess wall and the friction clutch members to close the clutch, and means for controlling the centrifugal action of said members on the clutch to keep the driving members and therefore the armature substantially free of clutch friction until said critical speed has been reached or exceeded.

35. A clutch according to claim 18 in which the spring means comprises a pair of symmetrically located spring fingers mounted adjacent each recess, each of which fingers extends into the path of the ball whereby outward movement of the ball further separates them.

36. A clutch as set forth in claim 32 having sets of inter-registering driving and driven disks adapted to be pressed together by the centrifugal clutch-operating members and in which springs included in the means for resisting initial clutch-operating movement of such members are adapted to continue to act on them and to return them as the speed of rotation slackens.

In testimony whereof, I have signed this specification.

FREDERICK T. RUSSELL.